United States Patent
Sogawa

(10) Patent No.: US 6,373,518 B1
(45) Date of Patent: Apr. 16, 2002

(54) IMAGE CORRECTION APPARATUS FOR STEREO CAMERA

(75) Inventor: Yoshiyuki Sogawa, Mitaka (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/310,930

(22) Filed: May 13, 1999

(30) Foreign Application Priority Data

May 14, 1998 (JP) .......................................... 10-132275

(51) Int. Cl.[7] ........................ H04N 5/225; H04N 13/00; H04N 5/262
(52) U.S. Cl. .......................................... 348/43; 348/218
(58) Field of Search ............................. 348/42, 47, 43, 348/218, 335, 358, 44, 46, 48, 36, 38, 39; H04N 5/225, 5/262, 13/00

(56) References Cited

U.S. PATENT DOCUMENTS 5,668,595 A * 9/1997 Katayama et al. .......... 348/218

FOREIGN PATENT DOCUMENTS

| JP | 05-114099 | 5/1993 |
| JP | 05-157557 | 6/1993 |
| JP | 10-307352 | 11/1998 |

* cited by examiner

Primary Examiner—Nhon T Diep
(74) Attorney, Agent, or Firm—Smith, Gambrell & Russell, LLP

(57) ABSTRACT

An image correction apparatus for a stereo camera which corrects optical positional deviations in images taken by the stereo camera, comprising:

means for performing interpolation on mutual referencing positions in stereo matching of a pair of images taken by the stereo camera by using pixel-by-pixel positional deviations that have been determined in advance and coordinate data around the referencing positions.

6 Claims, 4 Drawing Sheets

IMAGE CORRECTION APPARATUS FOR STEREO CAMERA

BACKGROUND OF THE INVENTION

1. Field of the Invention

The present invention relates to an image correction apparatus for a stereo camera which corrects an optical positional deviations in images taken by the stereo camera.

2. Description of the Related Art:

Image processing according to what is called a stereo method is known as a three-dimensional measuring technique using images. In this technique, in general, correlation between a pair of images obtained by imaging an object by two cameras (stereo camera) from different positions is determined and the distance is determined based on a parallax of the same object according to the principle of triangulation by using camera parameters such as installation positions and a focal length of the stereo camera.

In this image processing according to the stereo method, a position where two image signals that are output from the stereo camera coincide with each other by superimposing the two image signals while shifting those sequentially. Therefore, essentially, it is desirable that there exist, between the two images, only deviations between corresponding positions as caused by a parallax; if there exist positional deviations due to other optical distortions etc., mismatching occurs and the accuracy of distance information is lowered.

For the above reason, adjustments of optical positions are extremely important in using a stereo camera. Japanese Unexamined Patent Publication No. Hei. 5-157557 discloses a technique of mechanically adjusting and holding correlation between two video cameras by providing, on a holding member for connecting and holding the two video cameras, a parallelism adjusting means for making adjustments so that the pixel array of an image sensor of one video camera becomes parallel with that of an image sensor of the other video camera and an optical axis adjusting member for making adjustments so that the optical axis of one video camera becomes parallel with that of the other video camera.

However, conventionally, once deviations due to deterioration with age occur in a fixed stereo camera, readjustments should be performed in terms of mechanical structure. Readjustments not only require cumbersome operations but also take long time. Further, mechanical adjustments can assure only a limited degree of accuracy.

To cope with the above problems, the present applicant has proposed, in Japanese Patent Application No. Hei. 9-117268, a technique of making adjustments electrically rather than mechanically by affine-transforming images in accordance with deviations in optical positions of a stereo camera. This techniques makes it possible to adjust optical positions of the stereo camera precisely to such a level as is difficult to attain by mechanical adjustments, and to easily perform readjustments on deviations due to deterioration with age after original adjustments.

However, the correction technique by affine-transforming images that has been proposed by the present applicant is linear corrections, such as optical position corrections in the horizontal and vertical directions and the rotational direction and a correction of a variation in the focal length (angle of view) of a lens, that act uniformly on the entire image. Therefore, this correction technique cannot deal with non-linear distortions in an image due to influence of a lens distortion, differences in enlargement and reduction factors that depend on the region in an image as caused by inclination of the photodetecting surface of an imaging device, and other factors.

Further, in a stereo camera, there may occur a case that to orient a distance information generation region to an optimum direction in accordance with use, a main camera for taking a reference image for stereo processing and a sub-camera for taking a comparison image for the stereo processing are mounted in advance so as to be inclined from the base line of the stereo camera. For example, in a vehicular stereo camera, there may occur a case that to locate a distance detection region evenly in the right-left direction with respect to the visual field in the right-left direction, the main camera and the sub-camera are so mounted as to be directed rightward with respect to the front side of the camera system (i.e., the front side of the self vehicle) and a sub-camera-side region, accounting for a prescribed proportion, of an image taken by the main camera is employed as a distance information generation region.

Such inclined mounting of the two cameras with respect to the base line of the stereo camera requires nonlinear shape corrections on images taken. Corrections of nonlinear positional deviations in images including distortions of the above kinds due to a lens distortion, inclination of the photodetecting surface of an imaging device, etc. are an issue that remains to be addressed.

SUMMARY OF THE INVENTION

The present invention has been made in view of the above circumstances, and an object of the invention is therefore to provide an image correction apparatus for a stereo camera which can improve the reliability of stereo processing by making it possible to correct, in an on-board state, nonlinear positional deviations among optical positional deviations in images taken by the stereo camera.

The above-described object of the invention can be attained by an image correction apparatus for a stereo camera which corrects optical positional deviations in images taken by the stereo camera, comprising means for performing interpolation on mutual referencing positions in stereo matching of a pair of images taken by the stereo camera by using pixel-by-pixel positional deviations that have been determined in advance and coordinate data around the referencing positions.

That is, in the invention, interpolation is performed on referencing positions in the counterpart image in stereo matching of a pair of images taken by the stereo camera by using pixel-by-pixel positional deviations that have been determined in advance and coordinate data around the referencing positions, and matching is made by referring to interpolated coordinates, whereby mismatching between corresponding positions can be prevented.

DESCRIPTION OF THE PREFERRED EMBODIMENT

Figure 1:
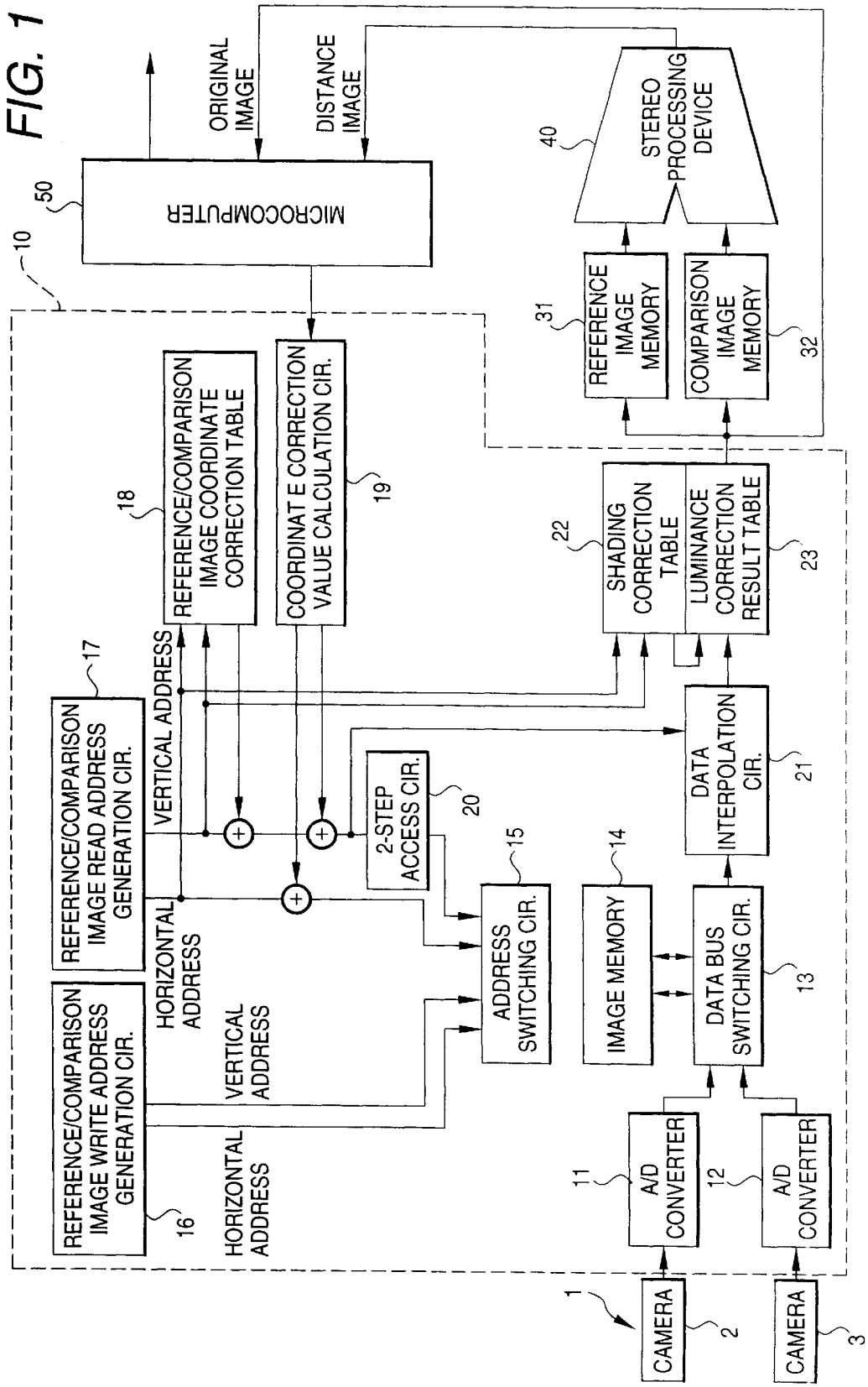
FIG. 1 is a diagram showing the entire configuration of a stereo processing system.
Figure 2:
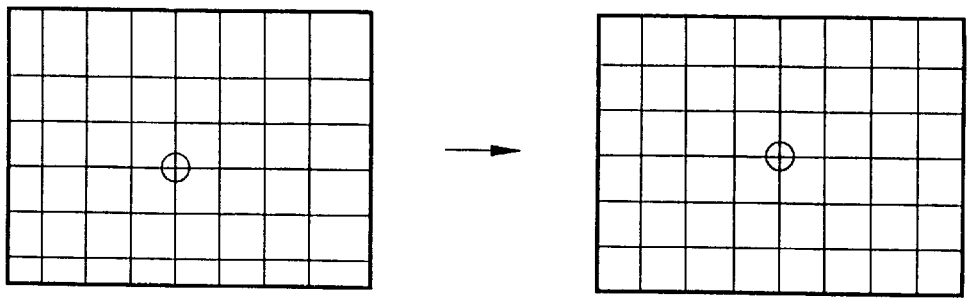
FIG. 2 is a diagram illustrating a correction pattern of a vertical/horizontal correction.
Figure 3:
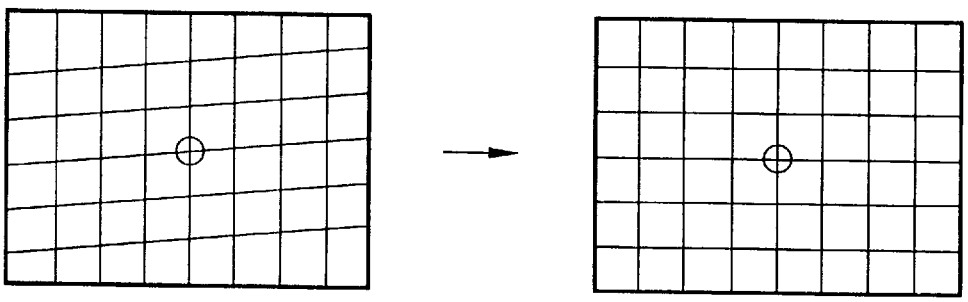
FIG. 3 is a diagram illustrating a correction pattern of a rotational correction.
Figure 4:
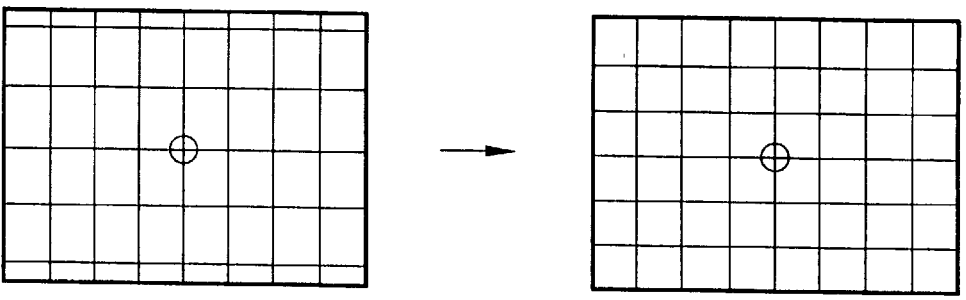
FIG. 4 is a diagram illustrating a correction pattern of a focal length correction.
Figure 5:
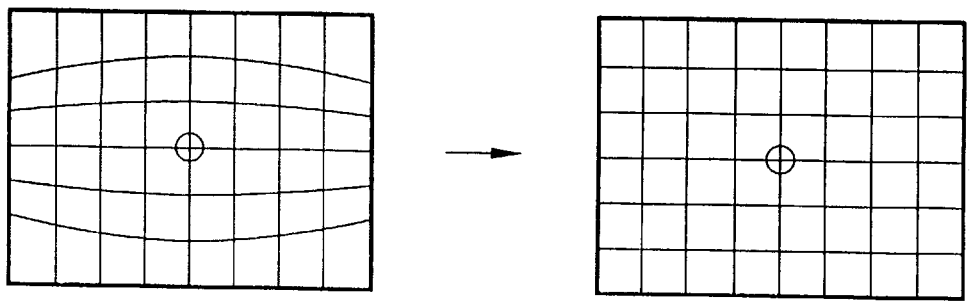
FIG. 5 is a diagram illustrating a lens distortion correction pattern.
Figure 6:
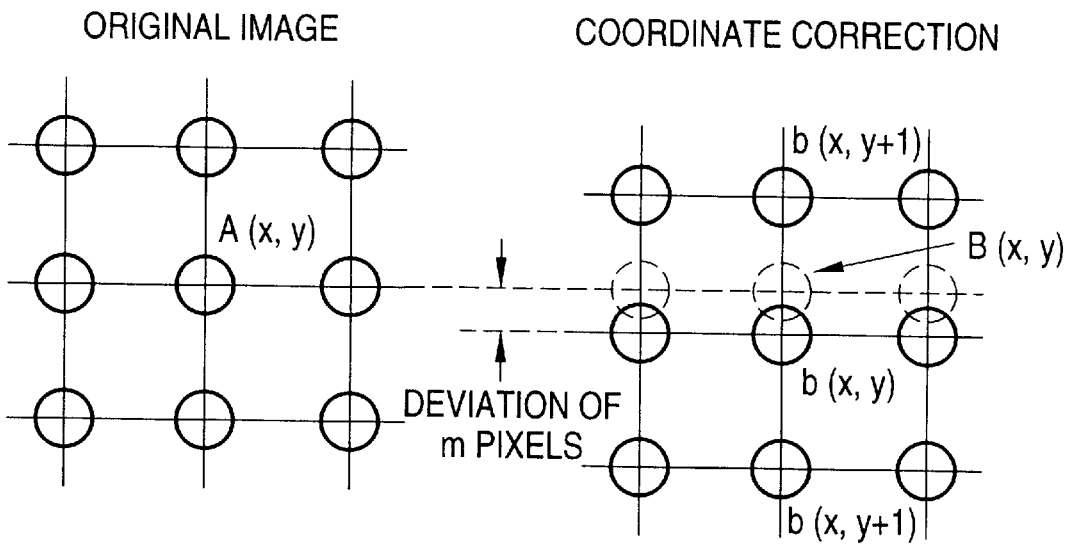
FIG. 6 is a diagram illustrating data interpolation in the vertical direction.
Figure 7:
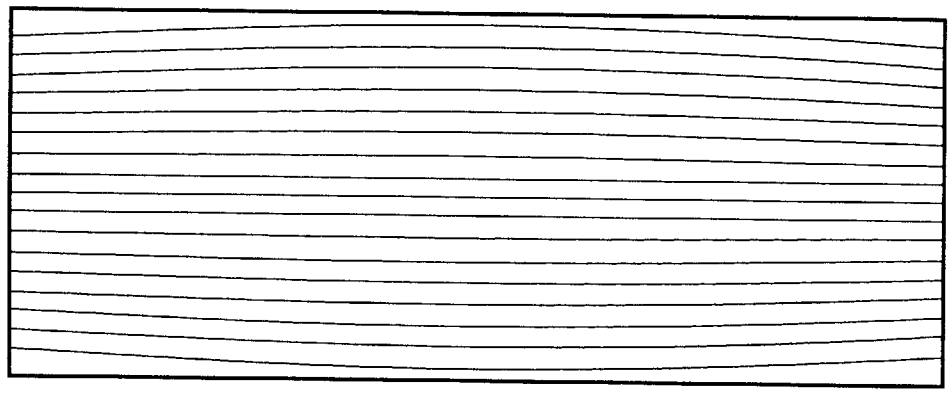
FIG. 7 is a diagram illustrating a picked-up image of a horizontal lattice pattern.
Figure 8:
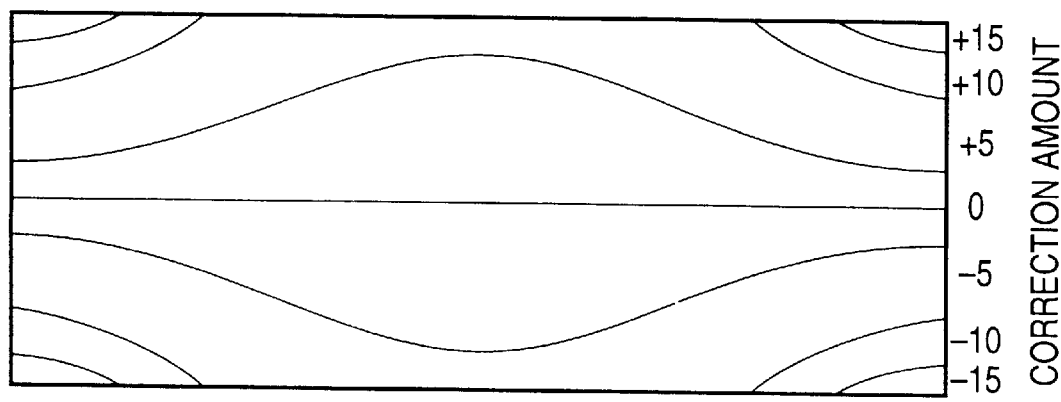
FIG. 8 is a diagram schematically illustrating a data distribution example of a coordinate correction table.
Figure 9:
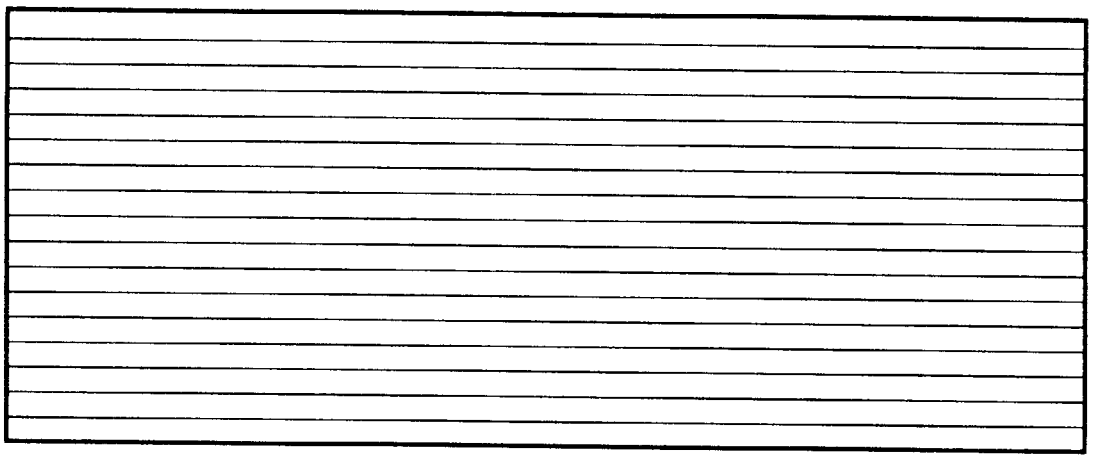
FIG. 9 is a diagram illustrating an image obtained by performing a coordinate correction on the original image.

An embodiment of the present invention will be hereinafter described with reference to the drawings. FIGS. 1 to 9 relate to the embodiment of the invention, in which FIG. 1 shows the entire configuration of a stereo processing system, FIG. 2 illustrates a correction pattern of a vertical/horizontal correction, FIG. 3 illustrates a correction pattern of a rotational correction, FIG. 4 illustrates a correction pattern of a focal length correction, FIG. 5 illustrates a lens distortion correction pattern, FIG. 6 illustrates data interpolation in the vertical direction, FIG. 7 illustrates a picked-up image of a horizontal lattice pattern, FIG. 8 schematically illustrates a data distribution example of a coordinate correction table, and FIG. 9 illustrates an image obtained by performing a coordinate correction on the original image.

FIG. 1 shows the configuration of a stereo image processing system which processes images taken by a stereo camera 1 that consists of two cameras each incorporating an image sensor such as a charge coupled device (CCD) and being variable in shutter speed. For example, this stereo image processing system is incorporated in a mobile body such as an automobile or a helicopter and used as part of a system for recognizing its environment and its own position.

One camera of the stereo camera 1 is a main camera for taking a reference image for stereo processing and the other camera is a sub-camera for taking a comparison image for the stereo processing. The stereo camera 1 is mounted on a camera stay (not shown) with a predetermined base line length. Two images taken by the respective cameras 2 and 3 are input via an image correction apparatus 10 as an image input apparatus to a stereo processing device 40, where the degree of coincidence of the two images is evaluated by stereo matching and a distance image is generated as three-dimensional image information in which far and near information is digitized.

In this case, although the two cameras 2 and 3 are fixed to the camera stay after they were adjusted mechanically in an initial manufacturing stage so that their optical axes became parallel with each other, each of images taken by the two cameras 2 and 3 is not necessarily an optimum one for stereo processing because it includes considerable levels of optically nonlinear positional deviations due to limitations in mechanical assembling accuracy, influence of a variation in lens focal length and a lens distortion, differences in enlargement and reduction factors that depend on the region in the picked-up image as caused by inclination of the photodetecting surface of an imaging device, and other factors.

In view of the above, the image correction apparatus 10 is so constructed as to provide optimum image data for stereo processing by correcting, on a pixel-by-pixel basis, optical positional deviations in an image taken by each camera 2 or 3. Analog images coming from the cameras 2 and 3 are converted by A/D converters 11 and 12 to digital images, which are then stored in an image memory 14 via a data bus switching circuit 13. The image data stored in the image memory 14 are corrected by a data interpolation circuit 21 on a pixel-by-pixel basis.

A reference/comparison image write address generation circuit 16 and a reference/comparison image read address generation circuit 17 are connected to the image memory 14 via an address switching circuit 15. The reference/comparison image read address generation circuit 17 accesses a reference/comparison image coordinate correction table 18 that stores pixel-by-pixel coordinate correction data.

Coordinate correction data that is output from a coordinate correction value calculation circuit 19 for calculating an image coordinate correction value in accordance with instructions from a microcomputer 50 is added to a horizontal address that is output from the reference/comparison image read address generation circuit 17, and a resulting address is output to the address switching circuit 15. Coordinate correction data that is output from the reference/comparison image coordinate correction table 18 and coordinate correction data that is output from the coordinate correction value calculation circuit 19 are added to a vertical address that is output from the reference/comparison image read address generation circuit 17, and a resulting address is output to the data interpolation circuit 21 as well as to the address switching circuit 15 via a 2-step access circuit 20.

An output of the data interpolation circuit 21 is input, together with an output of a shading correction table 22 that is accessed by the reference/comparison image read address generation circuit 17, to a luminance correction result table 23, where it is subjected to a luminance correction. Luminance-corrected image data are output to a reference image memory 31 and a comparison image memory 32.

Image data stored in the reference image memory 31 and the comparison image memory 32 are read into the stereo processing device 40 that is composed of a city block distance calculation circuit having a pipeline structure in which absolute value calculators and adders are connected together in pyramid form, a minimum value/pixel deviation detection circuit for evaluating the minimum value, the maximum value, etc. of city block distances, and other circuits. In the stereo processing device 40, the degree of coincidence is evaluated for each small region (e.g., a small region of 4×4 pixels) of the counterpart image and a distance image is generated. A distance image generation process is described in detail in Japanese Unexamined Patent Publication No. Hei. 5-114099 of the present applicant.

Further, distance image data that is output from the stereo processing device 40 and corrected original image data that is output from the image correction apparatus 10 are read into the microcomputer 50, where various recognition processes are executed. For example, when the system is applied to a vehicle, the microcomputer 50 recognizes a running environment such as a road shape and presence of a vehicle running ahead and outputs vehicle control data for, for example, alarming the driver by judging the degree of danger of collision, stopping the vehicle by activating the brake automatically, or increasing or decreasing the running speed automatically to maintain a safe distance from the vehicle running ahead.

In the above stereo processing system, a reference image taken by the main camera 2 and a comparison image taken by the sub-camera 3 are processed in a time-divisional manner by the image correction apparatus 10 as an image input apparatus. Image data of a small region for stereo matching is stored in the reference image memory 31. Image data for referring to a position corresponding to one small region is stored in the comparison image memory 32 by an amount covering a prescribed number of pixels of deviation in the horizontal direction (for example, an amount covering 100 pixels of deviation for a small region of 4×4 pixels, i.e., data of 4×104 pixels).

That is, in the image correction apparatus 10, analog images taken by the respective cameras 2 and 3 are converted by the A/D converters 11 and 12 to digital images of prescribed luminance gradation levels (e.g., gray scale of 256 gradation levels) and digital image data are stored in the image memory 14 at horizontal and vertical addresses specified by the reference/comparison image write address generation circuit 16 with the bus switched to the image memory 14 side by the data bus switching circuit 13.

When prescribed image data are stored in the image memory 14, the reference/comparison image read address generation circuit 17 starts image data reading. That is, the reference/comparison image coordinate correction table 18 is accessed and coordinate correction data (address correction data) is added to a vertical address, and coordinate correction data that is output from the coordinate correction value calculation circuit 19 is added to a horizontal address and the vertical address. The image memory 14 is accessed via the address switching circuit 15.

In this embodiment, the coordinate correction data that are stored in the reference/comparison image coordinate correction table 18 are data to be used for correcting components that are perpendicular to the scanning direction (horizontal direction) of the stereo matching, that is, initial correction data for correcting top-bottom deviations, rotational deviations, a lens distortion, and a focal length variation in reference and comparison images. For example, the coordinate correction data are 8-bit data in which the highest one bit represents a positive/negative sign indicating a correction direction, the next four bits represent an integer portion, and the lowest 3 bits represent a decimal portion. In this case, the correction is such that the maximum coordinate correction value is +16 pixels and the minimum coordinate correction resolution is 0.125 (⅛) pixel.

The reference/comparison image coordinate correction table 18 is generated in advance by imaging a particular imaging pattern for correction value measurement such as a square lattice pattern with the two cameras 2 and 3 at the same time and calculating coordinate correction values on a pixel-by-pixel basis for the images taken by the cameras 2 and 3. That is, the coordinates of the center of each lattice point is measured from an image taken with less than one pixel as a unit, a deviation of each lattice point is calculated by comparing the measured coordinates with a corresponding lattice point position of a reference square lattice pattern stored in a measuring computer, and a correction value for each lattice point is determined by subjecting the deviation to a data form conversion in which the correction direction is taken into consideration. A coordinate correction amount of each pixel is calculated by 4-point interpolation based on correction values of four lattice points around the pixel concerned, and stored in the table 18.

If appropriate, the reference/comparison image coordinate correction table 18 may store correction data only in the vertical or horizontal direction. FIGS. 7–9 shows an example in which correction data in the vertical direction are stored in the table 18. In this example, a horizontal lattice pattern for correction value measurement is imaged in advance by the two cameras 2 and 3 at the same time. FIG. 7 shows an example image taken by the camera 2 or 3. A center line (center-of-gravity line) located at the center of the width of each horizontal lattice line is determined from the image taken, and each center-of-gravity line is compared with a reference horizontal lattice that is stored in a measuring computer. Vertical coordinate correction values at respective pixels on the reference lattice are determined, and a coordinate correction table having a data distribution as shown in FIG. 8 is generated by determining coordinate correction values of pixels that are not located on the reference lattice by linear interpolation.

FIG. 9 shows a result of a correction in which the image of FIG. 7 that is obtained by imaging the horizontal lattice pattern has been corrected by using the coordinate correction table of FIG. 8. It is seen that remarkable distortions at four corner portions of the image taken are corrected and all the lattice lines are thereby corrected so as to extend horizontally.

Where correction data in the horizontal direction are stored in the table 18, a process similar to the above is executed by using a vertical lattice pattern. Where correction data in the vertical or horizontal direction are stored in the table 18, correction data in the other direction may be calculated by the coordinate correction value calculation circuit 19 (described later).

On the other hand, coordinate correction data that are output from the coordinate correction value calculation circuit 19 are data to be used for correcting top-bottom deviations, right-left deviations, rotational deviations, etc. of the cameras 2 and 3 due to deterioration with age based on instructions from the microcomputer 50, and are correction data that act on the entire image uniformly. In this correction, while a vertical correction is performed down to a ⅛ pixel, a vertical/horizontal coordinate correction is performed with one pixel as a unit. In this case, a coordinate correction amount in the horizontal direction is so set that corresponding positions in the counterpart image deviate by a predetermined number of pixels (e.g., 3 pixels) at infinity so that the entire object to infinity is included in the scanning range of the stereo matching. A simple version of a correction of rotational deviations can be realized by increasing or decreasing the vertical correction amount as the horizontal address increases, in accordance with rotational deviation correction data that are set by the microcomputer.

For example, as for a vertical/horizontal correction on top-bottom deviations or right-left deviations as shown in FIG. 2, correction is made at a minimum of a ⅛-pixel pitch in the vertical direction and 1-pixel pitch in the horizontal direction. As for a correction on rotational deviations as shown in FIG. 3, a correction on a focal length variation as shown in FIG. 4, and a correction on a lens distortion as shown in FIG. 5, correction is made at a minimum of a ⅛ pixel pitch only in the vertical direction.

That is, where stereo matching is performed in a small area having a relatively small number of pixels as in the case of this embodiment, data interpolation on only components that are perpendicular to the scanning direction of the stereo matching is performed at a resolution of less than one pixel and read addresses are shifted in the horizontal direction with one pixel as a unit, because information of luminance differences between adjacent pixels is lost in the data interpolation though the information loss is small, the processing time is long, and so forth.

Therefore, as for data that is obtained by coordinate-correcting a vertical address generated by the reference/comparison read address generation circuit 17, the lower 3 bits representing a decimal portion are output to the data interpolation circuit 21 and the upper 5 bits are used by the 2-step access circuit 20 to access, in two steps, two pixels located above and below in the vertical direction. Based on those data, the data interpolation circuit 21 performs interpolation on data of mutual referencing positions of the reference image and the comparison image in the stereo matching.

When coordinates A(x, y) of a certain pixel of the original image in the image memory 14 is deviated by m pixels from its proper position as shown in FIG. 6, the data interpolation circuit 21 determines positional-deviation-corrected coordinates B(x, y) by performing interpolation according to Equation (1) below in the case of a positive deviation or Equation (2) below in the case of a negative deviation by using coordinates b(x, y−1) and b(x, y+1) of two pixels located above and below in the vertical direction that are obtained through access by the 2-step access circuit 20. This process is executed for all pixels of the original image.

$$B(x, y)=b(x, y)\times(1-m)+b(x, y-1)\times m \quad (1)$$

$$B(x, y)=b(x, y)\times(1-m)+b(x, y+1)\times m \quad (2)$$

In this case, where corrections in both of the vertical and horizontal directions are performed with less than one pixel as a unit, coordinate data around a referencing position is determined by making 2-step access for each of a horizontal address and a vertical address and vertical interpolation and horizontal interpolation are performed by using those coordinate data and coordinate data obtained from the horizontal address line and the vertical address line.

In the luminance correction result table 23, image data corrected by the above-described data interpolation circuit 21 are corrected for a luminance reduction due to a shading phenomenon that occurs in the optical system of each camera by using data that are output from the shading correction table 22 that is accessed by the reference/comparison image read address generation circuit 17. Resulting data are stored in the reference image memory 31 and the comparison image memory 32.

The image data stored in the reference image memory 31 and the comparison image memory 32 are read into the stereo processing device 40 and subjected to stereo matching there. In the stereo matching, a process of calculating a city block distance between one small region of the reference image memory 31 and that of the comparison image memory 32 is repeated while a shift is made in the horizontal direction by one pixel each time until a shift of a predetermined number of pixels is made. The minimum value, the maximum value, etc. of city block distances are evaluated and it is checked whether the minimum value of city block distances truly indicates coincidence of the small regions of the two images. If check conditions are satisfied, a pixel deviation amount at which the city block distance is minimized is output as distance information corresponding to the small region of the reference image.

The stereo matching is performed in a state that not only influence of linear positional deviations that occur uniformly in the entire image taken by each camera 2 or 3 but also influence of nonlinear positional deviations for which the correction value varies locally have been removed in an on-board state. Therefore, there occurs no mismatching between corresponding positions and hence correct distance information is obtained, which makes it possible to improve the reliability of image processing.

Further, even where the two cameras 2 and 3 are mounted so as to be inclined from the base line, nonlinear shape corrections can be performed on an image taken from an oblique direction. A flexible system can thus be realized.

As described above, according to the invention, interpolation is performed on referencing positions in the counterpart image in stereo matching of a pair of images taken by the stereo camera by using pixel-by-pixel positional deviations that have been determined in advance and coordinate data around the referencing positions. Therefore, not only influence of linear positional deviations that occur uniformly in the entire image taken by each camera 2 or 3 but also influence of nonlinear positional deviations for which the correction value varies locally have been removed in an on-board state. Therefore, there occurs no mismatching between corresponding positions and hence correct distance information is obtained, which makes it possible to improve the reliability of image processing. Further, even where the stereo camera is mounted so as to be inclined from the base line, nonlinear shape corrections can be performed on an image taken from an oblique direction. Great advantages can thus be obtained as exemplified by an advantage that a flexible system can be realized.

What is claimed is:

1. An image correction apparatus, comprising:
    a stereo camera;
    a table storing in advance a coordinate correction value for each pixel of the stereo camera in accordance with positional deviations of a plurality of referencing positions around the pixel; and
    means for correcting coordinates of a certain pixel in images taken by the stereo camera by performing an interpolation calculation according to the coordinate correction value stored in the table corresponding to said certain pixel.

2. The image correction apparatus according to claim 1, wherein the table is generated in advance by imaging a particular imaging pattern.

3. An image correction apparatus for a stereo camera, comprising:
    means for determining a coordinate correction value for positional deviation of each pixel in image taken by the stereo camera;
    means for calculating coordinate data around a certain pixel in at least one of horizontal direction and vertical direction; and
    means for interpolating a coordinate of the certain pixel by performing interpolation accordance with the coordinate correction value and the coordinate data.

4. The image correction apparatus according to claim 3, wherein
    the means for determining coordinate correction value includes pixel-by-pixel coordinate correction value calculated by positional deviation data of a plurality of points located around the certain pixel, the positional deviation data being calculated by comparing imaging pattern including each point on an image taken by the stereo cameras with reference imaging pattern.

5. The image correction apparatus according to claim 3, wherein:
    the means for calculating coordinate data around the certain pixel calculates coordinate data of two pixels located above and below of the certain pixel.

6. The image correction apparatus according to claim 3, wherein:
    the means for calculating coordinate data around the certain pixel calculates coordinate data located around the certain pixel in a direction where correction is performed with less than one pixel.

* * * * *